United States Patent Office 3,278,258
Patented Oct. 11, 1966

3,278,258
PREPARATION OF PARTIALLY REDUCED
TRANSITION METAL BROMIDES
Erik G. M. Tornqvist, Roselle, and Edwin A. Schmall, Springfield, N.J., assignors to Esso Research and Engineering Company, a corporation of Delaware
No Drawing. Filed Oct. 17, 1961, Ser. No. 145,745
8 Claims. (Cl. 23—87)

This invention relates to a novel method of preparing partially reduced transition metal bromides. More particularly, it relates to a process of this nature wherein the corresponding transition metal chloride is reacted with hydrogen bromide in an inert molten metal. The invention also relates to novel transition metal halide salts prepared in this manner.

The recently developed low pressure catalytic process for preparing alpha olefin and diolefin polymers with transition metal salts and reducing agents such as aluminum alkyl compounds is now well known. The process is generally described in the literature, e.g., see U.K. Patent 810,023, and "Scientific American," September 1957, pages 98 et seq.

It has been recognized that the flexibility of these low pressure processes is enhanced by the wide variety of catalyst variants that are possible. This has been particularly the case in diolefin polymerizations where the number of stereoregular polymers of different structures is especially great. Thus, in the polymerization of the simplest of the conjugated dienes, butadiene-1,3, depending on the transition metal component, it has been possible to obtain, among others, cyclic trimers (Angew, Chemie, 69, 397 (1957)), linear high polymers in which the monomer addition has taken place essentially through 1,2 addition (Angew, Chemie, 68, 306 (1956)), linear high polymers with monomer addition essentially according to the 1,4-cis scheme (Australian patent application No. 22,440), and linear high polymers of essentially 1,4-trans type (Chim. e l'Industria, 40, 362 (1958)). High molecular weight polymers consisting of intromolecular mixtures of above structures can also be prepared by proper selection of the catalyst components.

Of particular interest is the fact that under certain conditions different crystal modifications of the same partially reduced transition metal compound will give different types of polymer. These observations have been limited to certain partially reduced transition metal chlorides, e.g., $TiCl_3$, however, the reason being that no methods have been known for preparing the corresponding pure, partially reduced bromides. At the same time the latter halides have been of potentially great interest as polymerization catalyst components because of the interesting results obtained with the unreduced bromides, e.g., $TiBr_4$, in comparison to the unreduced chloride, e.g., $TiCl_4$. As is now well known, these unreduced halides usually are reduced to a lower valence state by the metal alkyl compounds before becoming a part of the true polymerization catalyst. The partially reduced transition metal halides thus formed are usually of a rather undefined character, however, and may give widely varying polymerization results caused by only minor variations in the catalyst preparation procedure. By contrast, prereduced transition metal halides like $TiCl_3$ and $VCl_3$ will normally, when properly activated with metal alkyl compounds, give highly reproducible results and yield polymers of well defined structures.

In spite of the potentially interesting properties of catalysts containing prereduced transition metal bromides like $TiBr_3$, few if any studies of such catalysts have been carried out. The reason for this has been that these partially reduced compounds are very difficult to prepare in reasonably pure form. In general they are much more unstable than the corresponding chlorides and tend to disproportionate at the temperatures required for their preparation according to conventional methods such as hydrogen reduction of a halide in which the transition metal is in its maximum valence state, e.g., $TiBr_4$, or direct combination of a transition metal with bromine.

This invention provides a new and improved method of preparing the desired materials. The method for preparing the partially reduced halide comprises forming a slurry of the corresponding transition metal chloride in an inert molten metal halide in which the halide portion corresponds to the halide to be produced and then reacting the chloride with a hydrogen halide also corresponding to the halide to be produced. Further details follow.

The transition metals to which this invention applies are those of Group IV through VI–B and VIII–B of the Periodic Table and thus include titanium, zirconium, vanadium, chromium, niobium, molybdenum, tungsten, iron, cobalt, and nickel.

The term "partially reduced" as herein used, refers both to the starting material and the end product and indicates that the transition metal is in a valence state which is at least one unit below its maximum valence in combination with the particular halide, e.g., typical starting materials are $TiCl_3$, $VCl_3$, $TiCl_2$, $VCl_2$, $CrCl_3$, $CrCl_2$, $MoCl_4$, $MoCl_3$, $MoCl_2$, $FeCl_2$, etc., and typical products are the corresponding bromides.

The process is carried out by forming a slurry of the transition metal chloride in an inert molten metal halide, the halogen corresponding to the halide to be produced. The inert molten metal halide conveniently can be the transition metal halide corresponding to that being produced except that the metal is at its maximum valence state available in combination with the particular halide, e.g., $TiBr_4$ can be the inert molten metal halide in the preparation of $TiBr_3$, $WBr_5$ the molten halide in the preparation of $WBr_2$, etc. However, under certain conditions the molten metal halide may be formed in situ from the corresponding chloride simultaneously with the conversion of the partially reduced chloride to the corresponding bromide. Thus, a slurry of $TiCl_3$ in $TiCl_4$ may be converted into a slurry of $TiBr_3$ in $TiBr_4$ by simultaneous halogen exchange with HBr under the conditions herein described. It is not necessary, however, that the cation of the inert metal halide be the same as the desired product, e.g., in the preparation of $TiBr_2$ it is desirable to use $AlBr_3$, $GaBr_3$ or a similar difficultly reducible bromide as the molten metal halide in order to avoid oxidation of the $TiBr_2$ with $TiBr_4$ which would yield $TiBr_3$ instead of the desired $TiBr_2$. The term "inert" is accordingly utilized to exclude as far as possible this type of interaction. According to this definition the inert halide may also, under certain conditions, be a compound of another transition metal than that present in the partially reduced halide. Thus, $TiBr_4$ may be used as the inert slurrying medium for the conversion of $VCl_3$ to $VBr_3$ inasmuch as there is no tendency for oxidation of $VBr_3$ to $VBr_4$ by the $TiBr_4$. As a consequence, little, if any, contamination of the $VBr_3$ by (cocrystallized) $TiBr_3$ will take place and essentially all titanium present can be removed as $TiBr_4$. It is necessary that the metal halides used as the inert media be molten at a moderate temperature such as about 300° C. or lower, so as to avoid disproportionation of the partially reduced transition metal halide being formed.

One of the advantages of utilizing a higher valent transition metal halide of the product desired as the inert medium is, of course, that product contamination by a different metal is completely avoided. However, the separation of the pure partially reduced halide from the slurrying medium is generally quite simple because of the volatility and hydrocarbon solubility of the latter. Thus, the inert metal halide can be separated by physical means, e.g., by distillation or by its preferential solubility in hydrocarbons such as xylene, benzene, hexane, etc. Since the HCl formed in the halogen exchange reaction is evolved as a gas and thus removed during the course of the reaction, relatively pure products are obtained in a simple and efficient manner.

Whereas the upper temperature limit for the halogen exchange reaction is primarily determined by the stability of the particular partially reduced transition metal bromide being formed and usually does not exceed about 300° C., the lower temperature limit is primarily determined by the melting point of the halide used as the slurrying medium although the rate of halogen exchange may be too low to be practical at that temperature. The pressure used in the reaction may vary from subatmospheric up to about 200 p.s.i.g., but is of rather little importance. It will normally be advantageous to use a pressure which will allow the slurrying medium to reflux at the temperature considered most desirable for the reaction.

In order to avoid contamination by undesirable chemical elements, the material used for constructing the equipment should preferably be resistant to both the molten halide and the hydrogen halides present in the reaction. Thus, glass lined steel is particularly preferred, although glass or ceramic materials may be advantageously used when the pressure employed is moderate.

The process of this invention lends itself not only to the preparation of novel materials in which the transition metal component is in a well defined valence state but also to the preparation of materials of a very high degree of crystallinity. In addition, when the transition metal bromide can exist in two or more different crystallographic forms, it is often possible to obtain at will either of these forms by proper selection of the slurrying medium.

This invention and its advantages will be better understood by reference to the following examples.

*Example 1*

To a 1-liter 4-necked flask, equipped with stirrer, thermometer well, condenser and a dip tube for introduction of gaseous material was added inside a nitrogen-containing dry box: 920 g. (2.5 moles) $TiBr_4$ and 77.2 g. commercial $TiCl_3$. The equipment was then assembled in a hood outside the dry box while nitrogen blanketing was maintained over the charge. The flask was then heated causing the $TiBr_4$ to melt at about 39° C. At this time the stirring was started and dry HBr (dried by passing through $P_2O_5$ and $CaCl_2$ containing towers) was introduced at a rate of about 0.5 l./min. The temperature was now rapidly raised causing the liquid to reflux after about 20 minutes when the pot temperature reached 208° C. The refluxing was then continued for about 5½ hours under good stirring and with the monomer addition being maintained at the previous level.

Halogen exchange between the $TiCl_3$ and $TiBr_4$ and/or HBr evidently started before the refluxing began as evidenced by the darkening of the slurry and the low initial refluxing temperature, 208° C., which indicated that the liquid now contained some $TiCl_4$. The refluxing temperature increased, however, as the reaction proceeded until it reached a constant value of 220° C. after about 4 hours which was the refluxing temperature of pure $TiBr_4$ under these conditions of good stirring and simultaneous addition of HBr which was mainly converted through the halogen exchange into HCl which escaped through the nitrogen blanketed condenser and was absorbed in a water-containing trap. The true refluxing temperature of pure $TiBr_4$, about 230° C., was reached when the stirring and gas flow were interrupted temporarily.

The reaction was stopped when the mixture had been kept at the maximum refluxing temperature for ½ hours and the solid $TiBr_3$ recovered by filtration of the slurry through a sintered glass filter inside the dry box. After careful washing with dry, hot n-heptane and xylene followed by drying in vacuo on a stream bath, 136.5 g. of a brownish purple $TiBr_3$ were obtained. This amounted to an essentially quantitative yield when considering that the theoretical yield was 143.8 g. and that small losses necessarily occurred during the recovery procedure.

The purity of the product was established by elemental and X-ray diffraction analyses. The former indicated a halogen to titanium ratio in excess of 2.95 with about 99% of the halogen consisting of bromine, the rest being unexchanged chlorine. The X-ray diffraction pattern indicated that the material consisted of a highly crystalline mixture of two allotropic modifications of $TiBr_3$, hereinafter called alpha- and beta-$TiBr_3$, with no $TiCl_3$ being present. The diffraction peaks belonging to alpha-$TiBr_3$ were observed at $2\theta = 14.28°$ (s), 28.76° (vs), 31.14°, 40.32° (m), 48.88°, 52.54° (m) and 59.62° (m), while the peaks belonging to beta-$TiBr_3$ were observed at 15.5 (s), 27.08° (s), 30.82° (s), 40.32 (m), 41.8°, 44.48°, 47.74° (s), 53.16° and 58.0° (m). The letters in parentheses refer to the intensity of the peaks: very strong, strong, and medium. The other (weaker) peaks were all sufficiently strong to be easily detected and properly located.

Thus, a practically pure, highly crystalline $TiBr_3$ was prepared in essentially quantitative yield from commercial $TiCl_3$ using a total reaction time of only about 5½ hours of which not more than 1½ hours was spent at the refluxing temperature of pure $TiBr_4$.

When the same experiment was repeated using a longer refluxing time, about 10 hours, of which 7 hours were spent at the refluxing time of pure $TiBr_4$, an even purer $TiBr_3$ was obtained inasmuch as only traces of chlorine could be detected. The X-ray diffraction pattern of this sample showed that a mixture of alpha- and beta-$TiBr_3$ had again been formed although alpha-$TiBr_3$ formed the major part of this preparation. Thus, if needed, $TiBr_3$ of very high purity can be prepared according to the method of this example by using a sufficiently long reaction period.

*Example 2*

An experiment was performed essentially using the procedure of Example 1 but using $TiCl_4$ as the initial slurrying medium instead of $TiBr_4$. The charge, consisting of 50 g. $TiCl_3$ and 450 g. $TiCl_4$ was heated to refluxing (133° C.) under nitrogen blanketing whereupon the introduction of dry HBr was started under good stirring. The reflux temperature began slowly to rise, reaching 190° C. after 12 hours and 226° C. after 20 hours. The reaction was terminated at this point and the solid product recovered essentially as described in Example 1. The yield after thorough washing and drying was 80 g. or better than 86% of the theoretical. Elemental as well as X-ray diffraction analyses revealed that the solid consisted of essentially pure, bluish-black alpha-$TiBr_3$ containing only traces of chlorine. The X-ray diffraction pattern showed the following peaks characteristic for alphi-$TiBr_3$, $2\theta = 14.24°$ (vs), 28.78° (vs), 31.2° (vs), 40.26° (s), 48.8° (m), 52.53° (s), 57.6°, 59.16°, 59.44°, and 59.6° (m). No peaks which could be attributed to other compounds, e.g. $TiCl_3$ and beta-$TiBr_3$, could be detected.

In addition to the very high yield of practically pure $TiBr_3$, an almost quantitative yield of $TiBr_4$ was obtained.

Thus, the following two halogen exchanges had been accomplished simultaneously:

$$TiCl_3 + 3HBr \rightarrow TiBr_3 + 3HCl$$
$$TiCl_4 + 4HBr \rightarrow TiBr_4 + 4HCl$$

It thus becomes apparent that by starting from commercially readily available $TiCl_3$ and $TiCl_4$, one can simultaneously obtain the more valuable $TiBr_3$ and $TiBr_4$ in very good yields and high purity.

*Example 3*

An experiment was performed essentially as described in previous examples although liquid $AlBr_3$ was used as the slurrying medium. The charge consisted of 1333.6 g. (5 moles) $AlBr_3$ and 77.1 g. (½ mole) $TiCl_3$. The introduction of HBr was started shortly after the $AlBr_3$ had melted at about 98° C. and the mixture became stirrable. A refluxing temperature of 240° was reached after about 45 minutes. The mixture was then allowed to reflux for about 40 hours under good stirring and continuous HBr addition during which time the temperature rose to 243° C.

After recovery as described in previous examples, 87.3 g. of a dark, greenish-black material was obtained. Elemental analysis showed it to have the composition $TiBr_{2.99}$ with only traces of chlorine being present. The X-ray diffraction pattern showed that the $TiBr_3$ consisted of the pure beta-form. The following clearly distinguishable peaks were measured $2\theta = 10°$ and $80°$: 15.56°(vs), 27.08°, 29.46°(m), 30.87°(vs), 40.44°(s), 41.84°, 42.90°, 43.58°, 44.54°, 47.8°(vs), 51.98°, 53.14°(m), 55.86°, 58.2°(s), 60.46°, 61.05°, 64.3°, 65.32°(m), 74.14°, $$\left. \begin{array}{l} 78.2° \\ 78.44° \end{array} \right\} (m)$$

This shows that by properly selecting the slurrying medium one may obtain partially reduced transition metal halides of varying crystal structure, provided, of course, that the halides in question can occur in two or more allotropic forms.

Although the recovered yield amounted to only 87.3 g. $TiBr_3$ or about 61% of the theoretical, it was indicated also in this case that quantitative conversion of the $TiCl_3$ to $TiBr_3$ had taken place. The recovery under laboratory conditions from the rather high melting $AlBr_3$ was considerably more difficult than from the lower melting $TiBr_4$ and resulted in appreciable losses. It was also indicated that the $TiBr_3$ had some solubility in $AlBr_3$ which was slightly brownish colored after the reaction. This should be no problem in commercial processes, however, where $TiBr_3$-saturated $AlBr_3$ would be recycled and used as the slurrying medium.

Distillation experiments showed that the $AlBr_3$ used could be purified and recovered in an almost quantitative yield.

*Example 4*

An experiment was carried out as in previous examples but for the purpose of converting $VCl_3$ into $VBr_3$ in a slurry in molten $TiBr_4$. The latter compound was first prepared from 521 g. (300 ml.) $TiCl_4$ by halogen exchange with HBr under refluxing conditions using the same equipment as was later being used for the $VCl_3$ to $VBr_3$ conversion.

75 g. $VCl_3$ was added to the molten $TiBr_4$ when this had reached a constant reflux temperature, 224° C., indicating that complete conversion of the $TiCl_4$ to $TiBr_4$ had taken place. The mixture was then refluxed for 70 hours whereupon the solid and liquid components were separated and recovered as previously described.

The solid material amounted to 127.2 g. It was dark brown in color and identified as $VBr_3$ by X-ray diffraction which gave peaks at $2\theta = 14.30°(s), 28.9°(s), 31.52°(s), 40.73°, 49.40°(s), 58.27°(m)$, and $59.92°(m)$. By contrast no peaks attributable to $VCl_3$ could be detected.

Thus, an almost quantitative yield—the theoretical being 138.7 g.—of $VBr_3$ was obtained according to the method of this example.

*Example 5*

An experiment was performed as in Example 3 using 78.6 g. (½ mole) $VCl_3$ instead of $TiCl_3$ and a refluxing time of only about 20 hours.

126.8 g. of umber colored $VBr_3$ were recovered. This amounted to a practically quantitative yield considering the difficulties encountered when separating $VBr_3$ and $AlBr_3$ under laboratory conditions. The X-ray diffraction pattern of the $VBr_3$ was similar to that reported in Example 4 but additional peaks appeared at $2\theta = 27.9°$ and $52.9°$. Only traces of Al and Cl could be detected in the solid.

*Example 6*

The general utility of the method of this invention for the preparation of transition metal bromides was further demonstrated by converting $CrCl_3$ into $CrBr_3$ under the same conditions as described for $TiCl_3$ and $VCl_3$ in Examples 3 and 5, respectively. In this case, 79.2 g. (½ mole) $CrCl_3$ were refluxed in $AlBr_3$ for 75 hours.

After the usual recovery procedure an essentially quantitative yield of pure, olive green $CrBr_3$ was obtained. It exhibited characteristic X-ray diffraction peaks at $2\theta = 14.10°(vs), 29.94°(vs), 34.10°(m), 48.95°, 49.94°(m,) 57.77°, 58.8°, 60.08°(m), 61.93°, 77.75°$ and $81.96°$. By contrast no peaks belonging to $CrCl_3$ could be detected.

*Examples 7–14*

The utility of the titanium tribromides prepared according to this invention was demonstrated in a series of butadiene polymerization experiments. The polymerizations were carried out in 1 l. pressure bottles which were rotated in a thermostat controlled water bath. The catalyst compositions and experimental conditions are given in Table I.

At the end of the polymerization, the polymers were recovered by pouring the reaction mixtures under nitrogen blanketing into 1 l. isopropanol containing 0.5 g. phenyl-β-naphthylamine (PBN). Each bottle was then rinsed with 100 to 200 ml. benzene which was combined with the polymer-diluent-alcohol mixture. This mixture was then allowed to stand for 16–24 hours at room temperature, whereupon the high molecular weight polymer was filtered off and put back into 1 l. isopropanol containing 1 g. PBN where it was kneaded for some time. After again having been filtered off, the polymer was washed once more in 1 l. isopropanol containing 1 g. PBN, again filtered off and dried in vacuo to constant weight under nitrogen blanketing.

The combined filtrates were treated in a separatory funnel with 25 ml. concentrated HCl to decompose the catalyst. A volume of water equal to the total volume of filtrate was then added and the mixture shaken thoroughly, whereupon the phases were separated and the heavier aqueous phase discarded. The organic phase was washed once more in the same way and then treated with 50 ml. concentrated $Na_2CO_3$ solution to neutralize any HCl still present, whereupon it was washed again with water until it was neutral to litmus. The benzene and isopropanol were then removed from the organic phase by distillation at atmospheric pressure and the volatile polymerization products removed from the heavier bottoms by distillation in vacuo at 0.1 mm. Hg and with a final pot temperature of 150° C. The results obtained after this recovery procedure are shown in Table I.

The differences between the polymerization results obtained with the alpha- and beta-forms of $TiBr_3$, respectively, are striking. When $AlEt_3$ is used as the activator, the beta-form exhibits much greater activity than the alpha-form. The polymers obtained are also different. The alpha-form gives predominantly a high molecular weight, 100,000–170,000, polymer with relatively high cis-unsaturation, while the beta-form gives a high yield of a somewhat lower molecular weight, 12,000–26,000, polymer of relatively high trans-unsaturation. Both forms also yield distillation bottoms which are different from each other. The alpha-form yields a product which is almost solid at room temperature, while the beta-form yields a product which is liquid under the same conditions. Finally, the beta-form also gives small yields of butadiene dimers and trimers. Of particular interest is the formation of almost, about 80%, pure tr.,tr.,tr.-cyclododecatriene-(1,5,9), a compound which has never been reported prepared with a titanium based catalyst.

Differences also exist between the results obtained with alpha- and beta-TiBr$_3$ when AlEtCl$_2$ is used as the activator. Here the alpha-form is the more active and yields the high molecular weight polymer with the highest trans-unsaturation. In addition it yields rather large quantities of cyclododecatrienes.

These data show that different products are obtained with these two crystal modifications under otherwise identical conditions. They also indicate that valuable products can be obtained. For instance, the C$_8$ and C$_{12}$ fractions can be used as starting materials for making a variety of chemical compounds, the distillation bottoms can be used as thermosetting resins and the higher molecular weight products for making synthetic rubbers of varying properties. By changing the type and quantity of aluminum alkyl cocatalyst used, it is possible to change the polymerization to yield essentially one desirable type of product.

TABLE II.—POLYMERIZATION OF BUTADIENE WITH CrBr$_3$-ALUMINUM ALKYL CATALYSTS

[1 l. pressure bottles, 500 ml. benzene diluent, 100 g. butadiene, CrBr$_3$ ball milled 3 days]

| Example No. | 15 | 16 |
|---|---|---|
| Catalyst Composition: | | |
| CrBr$_3$, g [a] | 0.73 | 0.73 |
| Aluminum Alkyl: | | |
| Type | AlEt$_3$ | AlEtCl$_2$ |
| Weight, g | 0.86 | 0.95 |
| Al/Cr Ratio | 3 | 3 |
| Polymerization Conditions: | | |
| Temperature, °C | 50 | 50 |
| Time, hours | 48 | 72 |
| Results: | | |
| Solid or Rubbery Polymer, g | 0.2 | 0 |
| Butadiene Dimer, (C$_8$),[b] g | 18.0 | (e) |
| Butadiene Trimer (C$_{12}$),[d] g | 51.6 | 0 |
| Distillation Bottoms, g | 15.0 | [e] 90.0 |

[a] Prepared according to Example 6.
[b] Primarily cis,cis-cyclooctadiene-(1,5) and vinylcyclohexene. Some monobutenyl benzene may also be present.
[c] Gas chromatography revealed presence of traces in original product but nothing was recovered by distillation.
[d] About ⅔ tr.,tr.,tr.-cyclododecatriene-(1,5,9) and ⅓ cis,tr.,tr.-cyclododecatriene-(1,5,9).
[e] Yellow highly viscous liquid. Molecular weight determination with a Vapor Pressure Osometer gave a value of 550.

The advantages of this invention will be apparent to the skilled in the art. A novel, flexible process for preparing partially reduced transition metal bromides which are of distinct utility among others in opening new avenues of TABLE I.—POLYMERIZATION OF BUTADIENE WITH TiBr$^3$-ALUMINUM ALKYL CATALYSTS

[1l. pressure bottles, 500 ml. benzene diluent, 100 g. butadiene, solids ball milled 3 days]

| Example No. | 7 | 8 | 9 | 10 | 11 | 12 | 13 | 14 |
|---|---|---|---|---|---|---|---|---|
| Catalyst Composition: | | | | | | | | |
| TiBr$_3$: | | | | | | | | |
| Crystallographic Form [a] | Alpha | Beta | Alpha | Beta | Alpha | Beta | Alpha | Beta |
| Weight, g | 0.72 | 0.72 | 0.72 | 0.72 | 0.72 | 0.72 | 0.72 | 0.72 |
| Aluminum Alkyl: | | | | | | | | |
| Type | AlEt$_3$ | AlEt$_3$ | AlEt$_3$ | AlEt$_3$ | AlEt$_3$ | AlEt$_3$ | AlEtCl$_2$ | AlEtCl$_2$ |
| Weight, g | 0.285 | 0.285 | 0.570 | 0.570 | 0.856 | 0.856 | 0.635 | 0.635 |
| Al/Ti | 1 | 1 | 2 | 2 | 3 | 3 | 2 | 2 |
| Polymerization Conditions: | | | | | | | | |
| Temperature, °C | 30 | 30 | 25 | 25 | 25 | 25 | 25 | 25 |
| Time, hours | 48 | 48 | 48 | 48 | 48 | 48 | 48 | 48 |
| Results: [b] | | | | | | | | |
| Solid or Rubbery Polymer, g.[c] | 20.0 | 76.2 | 6.1 | 68.2 | 3.3 | 8.5 | 29.8 | 17.8 |
| Butadiene Dimer (C$_8$) [d] | 1.9 | 5.2 | | | (e) | (e) | 3.9 | 2.1 |
| Butadiene Trimer (C$_{12}$) [f] | | [g] 1.5 | | [g] 1.3 | | | 34.5 | 6.0 |
| Distillation Bottoms [h] | 8.3 | 6.5 | 8.8 | 20.0 | 6.0 | 28.7 | 29.5 | 26.9 |
| Properties of Solid or Rubbery Fraction: | | | | | | | | |
| Intrinsic Viscosity in Toluene at 20° C | 1.55 | 0.56 | 2.32 | 0.27 | | | | |
| Unsaturation by I.R., percent of total: | | | | | | | | |
| Vinyl | 10.7 | 5.8 | 14.9 | 7.6 | | | 1.4 | 4.4 |
| Cis | 61.4 | 44.1 | 53.8 | 18.3 | | | 3.2 | 9.7 |
| Trans | 27.9 | 50.1 | 31.3 | 74.1 | | | 95.4 | 85.9 |

[a] The alpha-form was prepared according to Example 2, and the beta-form according to Example 3.
[b] Some soluble polymer, C$_8$ and C$_{12}$ in particular, was probably lost during the recovery procedure, hence the true yields were probably greater than those reported.
[c] As precipitated out by the addition of 1 l. isopropanol to the polymer-diluent mixture at room temperature.
[d] Primarily cis, cis-cyclooctadiene-(1,5) and vinylcyclohexene. Some monobutenyl benzene may also be present in this fraction.
[e] Gas chromatography revealed the presence of 1–2 g. C$_8$ products but no such compounds were recovered.
[f] Primarily cyclododecatriene-(1,5,9).
[g] Largely, >80%, consisting of tr.,tr.,tr.-cyclododecatriene-(1,5,9), a product never reported to have been prepared with a titanium based catalyst. Cf. J. Polymer Sci., 38, 45 (1959) and Angew. Chemie, 69, 397 (1957).
[h] After distillation at 0.1 mm. Hg and with a final pot temperature of 150° C., the molecular weights of the bottoms as determined with a Vapor Pressure Osmometer were in order: 870, 520, 820, 524, 710, 760, 460 and 480.

*Examples 15 and 16*

Two butadiene polymerizations were carried out as described in Examples 7–14 but with the CrBr$_3$ of Example 6 as the transition metal component. The polymerization conditions and results are reported in Table II.

This time very little high molecular weight polymer was formed. Instead, large quantities of highly desirable C$_8$ and C$_{12}$ fractions were formed when AlEt$_3$ was used as the activator, while a yellow, pleasant smelling viscous liquid of a molecular weight of about 550 was formed in an almost quantitative yield when AlEtCl$_2$ was used as the activator. The latter polymer could be used as a thermosetting resin similar to the well-known Buton type resins.

research in low pressure polymerization with the standard reducing agents is made available.

It is to be understood that this invention is not limited to the specific examples which have been offered merely as illustrations and that modifications may be made wihout departure from the spirit of the invention.

What is claimed is:

1. A method of preparing a partially reduced Group IV to Group VI–B and VIII–B transition metal bromide which comprises forming a slurry of the corresponding partially reduced transition metal chloride in a molten inorganic metal bromide that is substantially inert to reduction at reaction conditions, said metal bromide being molten at a maximum temperature of about 300° C., the metal portion of said inorganic metal halide being at its maximum valence state available in combination with the bromide, reacting said transition metal chloride in said inorganic metal bromide slurry with hydrogen bromide for a time sufficient to react said partially reduced transition metal chloride, and separating the partially reduced transition metal bromide product from said inorganic metal bromide.

2. The process of claim 1 in which the partially reduced transition metal halide prepared is $TiBr_3$, the chloride reactant is $TiCl_3$, the inorganic metal halide is $TiBr_4$ and the hydrogen halide is HBr.

3. The process of claim 1 in which the partially reduced transition metal halide prepared is $VBr_3$.

4. The process of claim 1 in which the partially reduced transition metal halide being prepared is $CrBr_3$.

5. A method for the formation of substantially pure alpha-titanium tribromide which comprises forming a slurry of titanium trichloride in molten titanium tetrachloride, heating said slurry in the presence of hydrogen bromide for a time sufficient to substantially completely react said titanium trichloride, and separating the alpha-titanium tribromide product from the reaction mixture.

6. A method for the formation of substantially pure beta-titanium tribromide which comprises forming a slurry of titanium trichloride in molten aluminum tribromide, heating said slurry in the presence of hydrogen bromide for a time sufficient to substantially completely react the titanium trichloride, and separating the beta-titanium tribromide from the reaction mixture.

7. The method of claim 5 wherein the weight ratio of $TiCl_4$ to $TiCl_3$ in the reaction slurry is about 9:1.

8. The method of claim 6 wherein the molar ratio of aluminum bromide to titanium trichloride in the reaction slurry is about 10:1.

References Cited by the Examiner
UNITED STATES PATENTS

| | | | |
|---|---|---|---|
| 2,522,679 | 9/1950 | Kroll | 23—87 |
| 2,904,397 | 9/1959 | Nielsen | 23—87 |
| 2,907,632 | 10/1959 | Maxim | 23—87 |
| 2,961,293 | 11/1960 | Newnham | 23—87 |
| 3,010,787 | 11/1961 | Tornqvist | 23—87 |
| 3,063,798 | 11/1962 | Langer et al. | 23—87 |

OTHER REFERENCES

Gayer et al.: Chem. Abstracts, vol. 54, No. 8, page 7393 (April 25, 1960).

Klanberg et al.: Chem. Abstracts, vol. 55, No. 8, page 7124 (April 17, 1961).

OSCAR R. VERTIZ, *Primary Examiner.*

GEORGE D. MITCHELL, MAURICE A. BRINDISI,
*Examiners.*

S. SCOVRONEK, E. STERN, *Assistant Examiners.*